3,301,792
REACTIVATION OF MOLECULAR SIEVES
William Joseph Lewallen, Tulsa, and Joseph Francis Wood, Pawhuska, Okla., assignors to Skelly Oil Company, Tulsa, Okla., a corporation of Delaware
Filed Sept. 29, 1964, Ser. No. 400,074
8 Claims. (Cl. 252—418)

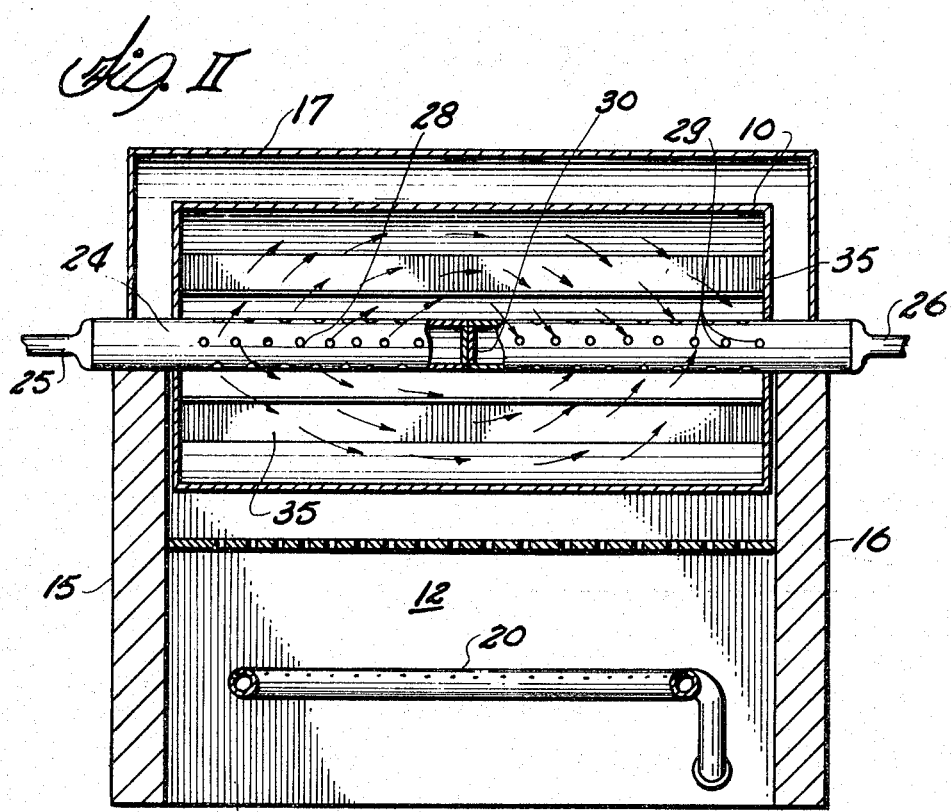
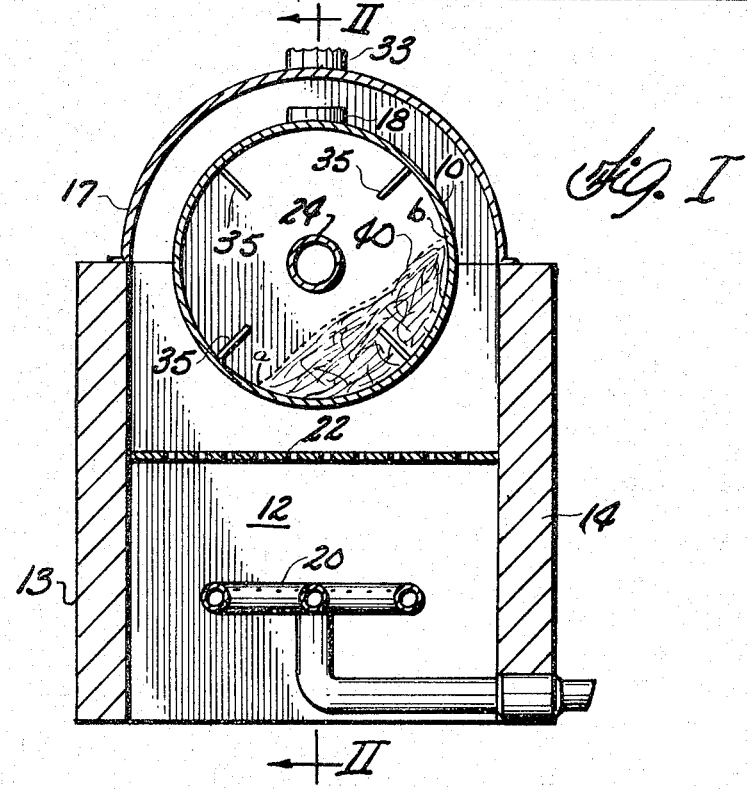

This invention relates to the reactivation of crystalline zeolitic molecular sieves.

The physical and chemical nature of crystalline zeolitic molecular sieves are well known. Briefly, molecular sieves are crystalline dehydrated zeolites, natural or synthetic, having a well defined physical structure. The nature and various types of molecular sieves are described in considerable detail in the literature, for example, U.S. Patent 3,069,362.

As is also known, molecular sieves have the ability to adsorb certain types of molecules while rejecting other types of molecules. This property can be relied on for separating chemical compounds of different molecular types. For example, normal paraffins can be separated from mixtures of other hydrocarbons because the normal paraffins are preferentially adsorbed within the pores of certain molecular sieves. Likewise, olefins may be removed from refinery gas streams, acetylenic compounds may be removed from olefins and sulfur-, oxygen- and nitrogen-containing organic compounds may be separated from other hydrocarbon compounds.

As a result of using molecular sieves for separation of various types of hydrocarbon compounds, the molecular sieves lose their activity due to the deposition thereon of carbon, sulfur and other deposits with the result that the adsorptive capacity of the molecular sieves is significantly reduced. Consequently, the molecular sieves must be periodically reactivated by removal of such deposits. It is, of course, desired to restore the adsorptive capacity of spent or used molecular sieves to the original level.

It is therefore a principal object of the present invention to provide a process for reactivating crystalline zeolitic molecular sieves.

It is a further object of the present invention to provide a process for reactivating crystalline zeolitic molecular sieves without substantial damage to the molecular sieves.

It is a further object of the invention to provide a simple and highly convenient process for restoring the adsorptive capacity of spent molecular sieves to a high level.

It is a further object of the invention to provide a process for restoring the adsorptive capacity of spent molecular sieves to a high level, which process can be safely conducted without damage to the crystalline structure of the molecular sieves but yet does not require constant supervision or frequent variation in operating conditions.

In accordance with the present invention, crystalline zeolitic molecular sieves are reactivated, that is, deposits are removed therefrom with corresponding restoration of adsorptive capacity by subjecting at an elevated temperature a moving mass of the spent molecular sieves to an oxidizing atmosphere for controlled time periods sufficient to remove undesired deposits from the molecular sieves but insufficient to cause ignition thereof. More particularly, the spent molecular sieves are reactivated in accordance with the present invention in an apparatus which continuously causes movement of the mass of molecular sieves so as to expose a portion of the mass to the oxidizing atmosphere and to then quench the oxidation. Any suitable apparatus can be employed for this purpose, such as, for example, a rotary kiln having means for introduction of oxygen or air and which can be heated to the desired operating temperature. The rate of rotation of the heating apparatus, air flow rates, and temperatures are regulated so that undesired deposits on the molecular sieves are burned off during the short period that the sieves are exposed to the oxidizing atmosphere with the burning being quickly quenched to avoid spontaneous ignition of the deposits on the molecular sieves. Ignition of the carbon deposited on the molecular sieves causes sintering thereof and destroys the crystal lattice of the sieve crystals thus rendering them useless for separation purposes. The alternate burning and quenching cycles are repeated until the reactivation of the molecular sieve is substantially complete; that is the adsorptive capacity of the molecular sieves has been restored to the maximum level. It has been found that by the reactivation method of the present invention the adsorptive capacity of molecular sieves can be restored to from about 80 to 85% of the original capacity, which is very good.

The invention will be further described in conjunction with the accompanying drawings wherein:

FIGURE I is a cross-sectional view of apparatus suitable for conducting the reactivation process of the present invention.

FIG. II is a cross-sectional view taken on the line II—II of FIGURE I.

Referring specifically to the drawings, numeral 10 indicates a horizontal rotary kiln disposed within a furnace chamber 12, defined by walls 13, 14, 15, 16 and top 17. The kiln 10 is provided with a hatch 18 through which the molecular sieve charge is introduced and removed from the kiln. The kiln is heated by burner 20 disposed below plate 22 which extends across the furnace for the purpose of distributing the flame and effecting uniform heating throughout the furnace 12.

A perforated conduit 24 extends through the entire length of the horizontal kiln 10, with the respective air inlet end 25 and air outlet end 26 extending through and out beyond the walls of the furnace. This conduit may be supported by the walls of the furnace or by separate supports. Conduit 24 is provided with a plurality of air holes 28 and 29. As will be noted, conduit 24 is interrupted and divided into two sections by divider 30. Thus, air entering inlet 25 cannot pass through the entire conduit, but must of necessity escape through the perforations 28 into the interior of the rotary kiln 10. Likewise, the air escapes from the interior of the kiln 10 by passing through exhaust holes 29 and out through outlet 26. The direction of air flow is indicated on the drawing by arrows. Exhaust gases escape from the furnace 12 through stack 33.

Referring to FIG. I, it is seen that four inwardly projecting wiers 35 extend throughout the longitudinal distance of the kiln 10 and are spaced 90° from each other. These wiers, the function of which will be described hereinafter, preferably extend into the kiln a distance of approximately 10% of the kiln diameter. The numeral 40 indicates a dotted line depicting the approximate surface of the molecular sieve mass undergoing regeneration while kiln 10 is rotated in a counterclockwise direction. The direction of rotation of the kiln is, of course, optional.

In the practice of the invention, a spent molecular sieve is loaded into the kiln 10 to a depth of approximately 0.3 to 0.4 of the diameter of the kiln. The kiln is closed and rotated by means of a motor and gears (not shown) at a rate of 8 to 12 revolutions per minute, preferably 10. The speed of rotation positively controls the period of exposure of the molecular sieve to the oxidizing atmosphere. Dry air is introduced into the kiln through air inlet 25 at a rate of from about 1.36 to about 1.84 cubic feet per minute per 100 pounds of the molecular sieve charge. Heat is applied within the furnace 12 to raise the internal kiln temperature to an operating level of from about 700° F. to not substantially more than 1000° F. Preferably, the operating temperature is maintained at 750° F. to 800° F.

When the operation is established and conditions have obtained equilibrium, the molecular sieve is alternately subjected to burning and quenching; with the burning of the deposits on the molecular sieve taking place for only short periods sufficient to remove carbon and other deposits but insufficient to adversely affect the molecular sieves. Thus, in operation, as the rotary kiln 10 is rotated at 10 revolutions per minute in a counterclockwise direction, the longitudinal wiers spill unexposed molecular sieve pellets across the surface (chord a—b) of the bed being reactivated, exposing the pellets to the oxidizing atmosphere. Only the portion of the molecular sieve charge which is located at this interface is actually subjected to the oxidizing atmosphere, which effects burn-off of the carbonaceous and other deposits. Because of the placement of the wiers and speed of rotation, breakover of the sieve mass occurs on the average of 20 times per single revolution of the kiln, resulting in an exposure time to the reactivating atmosphere of approximately 0.3 second per exposure before they are removed from the reaction interface by the succeeding "wier-spill' of unexposed molecular sieve pellets. The exposure time of the molecular sieves to the oxidizing atmosphere should preferably be from about 0.2 to about 0.4 second. Operating in this manner, the carbon and other deposits on the molecular sieves, such as sulfur, hydrocarbons and so forth, are burned off, yet the sieve is exposed to the oxidizing atmosphere for only a short period with the burning being quenched before spontaneous ignition of the charge occurs. These cycles of burning and quenching can be repeated as long as necessary to achieve maximum reactivation. Generally, the reactivation process is conducted from 24 to 96 hours, although it can be conducted for longer periods without damage to the structure of the molecular sieves undergoing reactivation as would occur in fixed bed reactivation processes.

The described reactivation procedure of the present invention removes from the molecular sieves deposits and contaminents such as, for example, petroleum oils, high molecular weight mercaptans and the like, which are normally not removed by prior art reactivation methods. This is accomplished without cracking and the attendant deposition of additional carbonaceous deposits in the pore space of the molecular sieves, thus achieving a more complete reactivation. Water which is removed from the molecular sieves is prevented by the succeeding "wier-spill" from remaining in contact with the reactivated molecular sieve. This water or steam escapes from the kiln through stack 33 without being readsorbed by the molecular sieve. This is highly advantageous since exposure of the molecular sieves to water and/or steam at elevated temperatures destroys the lattice structure in the molecular sieves.

In one embodiment of the basic process sodium carbonate or the like is incorporated with the zeolitic molecular sieves undergoing regeneration to improve the efficiency of the regeneration, particularly when a sulfurous compound constitutes a deposit on the sieve.

The following illustrates one specific embodiment of the present invention: A bed of zeolitic molecular sieves was employed to remove sulfurous compounds from liquefied petroleum gases ethane, propane, butane and mixtures thereof. The petroleum gases before treatment contained from about 0.02211 to 0.02457 weight percent sulfur, whereas the effluent from the molecular sieve bed contained from about 0.00012 to 0.00024 weight percent sulfur.

The sulfurous compounds which accumulated on the molecular sieves were desorbed by reverse flow through the bed of a sulfur-free petroleum gas at temperatures of about 450 to 500° F. The desorption with the hot petroleum gas removes approximately 99% of the adsorbed sulfur compounds. However, the residual non-desorbed sulfur compounds accumulate in and on the molecular sieves untill such time as the adsorptive capacity of the sieve bed is so low as to make further use thereof economically impractical, in this case approximately 50% of the original activity. At this time the molecular sieves were regenerated or reactivated by the process of the present invention.

To this end, three hundred pounds of the spent zeolitic molecular sieves from the above-described sulfur removing process were loaded into a rotary kiln together with 75 pounds of 58% sodium carbonate. The kiln was rotated at 10½ revolutions per minute while air flow to the rotary kiln was set at 2 cubic feet per minute. Heat was applied to the kiln at a rate sufficient to provide a temperature therein of 750° F. to 900° F. in approximately 6 hours. These conditions were continuously maintained for 36 hours or until samples taken from the kiln indicated that the zeolitic molecular sieve had obtained the desired level of regeneration. Heat input was stopped but the kiln was permitted to rotate and air permitted to flow thereinto until the kiln was cooled to a temperature of from 100° F. to 130° F. The zeolitic molecular sieves were removed from the kiln and were then ready for reuse.

The adsorptive capacity (activity) of zeolitic molecular sieves treated as above before regeneration and after regeneration has been compared by measuring the quantity of carbon dioxide retained thereby at atmospheric pressure and at ambient temperature of 80° F. These results are tabulated below:

|  | Carbon Dioxide Capacity; grams per 100 grams Molecular Sieve | Percent of new Molecular Sieve Capacity |
| --- | --- | --- |
| New Zeolitic Molecular Sieve | 17.5 | 100.0 |
| Exhausted Zeolitic Molecular Sieve | 3.6 | 20.5 |
| Reactivated Zeolitic Molecular Sieve: | | |
| Air only | 12.8 | 73.1 |
| Air with Sodium Carbonate | 14.4 | 82.3 |

The advantages of the present invention include, among others: (1) the adsorptive capacity of molecular sieves can be restored to high levels in a convenient manner; (2) heavy liquids such as oil and high molecular weight mercaptans as well as carbonaceous and sulfur deposits can be removed from spent molecular sieves; (3) after initial regulation of temperature, air flow rate and rate of revolution of the rotary kiln it is no longer necessary to maintain constant supervision over the process and the reactivation procedure can be carried out for any length of time without risk of damage to the molecular sieves; (4) conventional apparatus can be adapted for use in the reactivation process of the invention since the apparatus need only be adapted for rotation at a fixed rate and have means connected therewith for uniform heating and introduction of compressed air; and (5) no preliminary treatment of the molecular sieves is required before processing.

Those modifications and equivalents which fall within the spirit of the invention and the scope of the appended claims are to be considered part of the invention.

We claim:

1. A process for reactivating crystalline zeolitic molecular sieves which comprises alternately oxidizing and quenching oxidation of a mass of molecular sieve pellets, the said oxidation being carried out at a temperature in the range from about 700 to 1000° F. for short periods not substantially in excess of 0.4 second.

2. A process for reactivatiing crystalline zeolitic molocular sieves which comprises alternately oxidizing and quenching oxidation of a mass of molecular sieve pellets, the said oxidation being carried out at a temperature in the range from about 750 to 800° F. for short periods ranging from about 0.2 to about 0.4 second.

3. A process for reactivating crystalline zeolitic molecular sieves which comprises alternately oxidizing and quenching oxidation of a moving mass of molecular sieve pellets, the said oxidation being carried out at a temperature in the range from about 700 to 1000° F. for short periods ranging from about 0.2 to about 0.4 second.

4. A process for reactivating crystalline zeolitic molecular sieves which comprises alternately oxidizing and quenching oxidation of a mass of molecular sieve pellets, the said oxidation being carried out at a temperature in the range from about 700 to 1000° F. for a period of approximately 0.3 second to effect burn-off of deposits thereon.

5. A process for reactivating crystalline zeolitic molecular sieves which comprises introducing a mass of molecular sieve pellets into a rotating drum, introducing air into the interior of said drum at a rate of from about 1.36 to 1.84 cubic feet per minute per 100 pounds of molecular sieve charge, rotating said drum at a rate from about 8 to 12 revolutions per minute, while maintaining the temperature in the interior of said drum in the range from about 700 to 1000° F.

6. The process of claim 5 wherein the process is carried out until the adsorptive capacity of the molecular sieve undergoing reactivation is at least 80% of the original capacity thereof.

7. A process according to claim 5 wherein sodium carbonate is incorporated with the zeolitic molecular sieves undergoing reactivation.

8. A process for reactivating crystalline zeolitic molecular sieves which comprises introducing a mass of molecular sieve pellets into a rotating drum, introducing air into the interior of said drum at a rate of about 1.6 cubic feet per minute per 100 pounds of molecular sieve charge, rotating said drum at a rate of about 10 revolutions per minute, while maintaining the temperature in the interior of said drum in the range from about 750 to 800° F.

References Cited by the Examiner

UNITED STATES PATENTS

| | | | |
|---|---|---|---|
| 2,718,453 | 8/1955 | Beckman | 23—122 |
| 3,039,953 | 6/1962 | Eng | 252—416 |
| 3,069,362 | 12/1962 | Mays et at. | 252—419 |

OSCAR R. VERTIZ, *Primary Examiner.*

A. GREIF, *Assistant Examiner.*